(12) United States Patent
Li et al.

(10) Patent No.: US 9,776,669 B2
(45) Date of Patent: Oct. 3, 2017

(54) CHASSIS MOUNT STRUCTURE

(71) Applicant: GM GLOBAL TECHNOLOGY OPERATIONS LLC, Detroit, MI (US)

(72) Inventors: Yunjun Li, West Bloomfield, MI (US); Teodorico G. Terry, Rochester, MI (US); Jeffry Pniewski, Dryden, MI (US); Ferdous M. Ghazi, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/543,096

(22) Filed: Nov. 17, 2014

(65) Prior Publication Data

US 2015/0239505 A1 Aug. 27, 2015

Related U.S. Application Data

(60) Provisional application No. 61/944,781, filed on Feb. 26, 2014.

(51) Int. Cl.
*B62D 24/00* (2006.01)
*F16B 5/02* (2006.01)

(52) U.S. Cl.
CPC ............... *B62D 24/00* (2013.01); *F16B 5/02* (2013.01)

(58) Field of Classification Search
CPC .................................. B62D 24/00; F16B 5/02
USPC .......................................................... 296/35.1
See application file for complete search history.

(56) References Cited

U.S. PATENT DOCUMENTS

| | | | | |
|---|---|---|---|---|
| 5,413,303 A | * | 5/1995 | Lee ........................... | B21D 1/14 248/354.1 |
| 5,695,297 A | * | 12/1997 | Geib ....................... | F16B 7/149 403/369 |
| 6,857,889 B1 | * | 2/2005 | Vitale .................... | B62D 24/00 439/266 |

FOREIGN PATENT DOCUMENTS

| | | |
|---|---|---|
| CN | 101348131 | 1/2009 |
| CN | 203094192 U | 7/2013 |
| DE | 19617565 A1 | 11/1997 |
| KR | 20060069761 A | 6/2006 |

* cited by examiner

*Primary Examiner* — Joseph D Pape
*Assistant Examiner* — Dana Ivey
(74) *Attorney, Agent, or Firm* — Quinn IP Law

(57) ABSTRACT

A mounting assembly is configured to join a vehicle body to a vehicle chassis with a bolt. The mounting assembly includes an outer tube and an inner sleeve. The outer tube defines a sleeve channel, and is configured to be fixed to one of the vehicle chassis and the vehicle body. The inner sleeve is disposed within the sleeve channel of the outer tube, and defines a bolt hole configured to receive the bolt. The outer tube, the inner sleeve, and the bolt cooperate to join the vehicle body to the vehicle chassis. An initiation slot is defined in the outer tube, such that the sleeve channel is an incomplete cylindrical shell.

18 Claims, 6 Drawing Sheets

CHASSIS MOUNT STRUCTURE

CROSS-REFERENCE TO RELATED APPLICATIONS

This application claims the benefit of U.S. Provisional Application No. 61/944,781, filed Feb. 26, 2014, which is hereby incorporated by reference in its entirety.

TECHNICAL FIELD

This disclosure relates to mounting joints or mounting assemblies and, more particularly, to mounting joints or mounting assemblies joining vehicle body portions and vehicle chassis portions.

BACKGROUND

Some vehicles have body-on-frame or body-on-chassis architecture. In these architectures, a body is mounted to a rigid frame or chassis that supports the drivetrain.

SUMMARY

A mounting assembly is provided. The mounting assembly is configured to join a vehicle body to a vehicle chassis with a bolt. The mounting assembly includes an outer tube and an inner sleeve.

The outer tube defines a sleeve channel, and is configured to be fixed, or fixedly attached, to one of the vehicle chassis and the vehicle body. The inner sleeve is disposed within the sleeve channel of the outer tube, and defines a bolt hole configured to receive the bolt. The outer tube, the inner sleeve, and the bolt cooperate to join the vehicle body to the vehicle chassis. An initiation slot is defined in the outer tube, such that the sleeve channel is an incomplete cylindrical shell.

The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
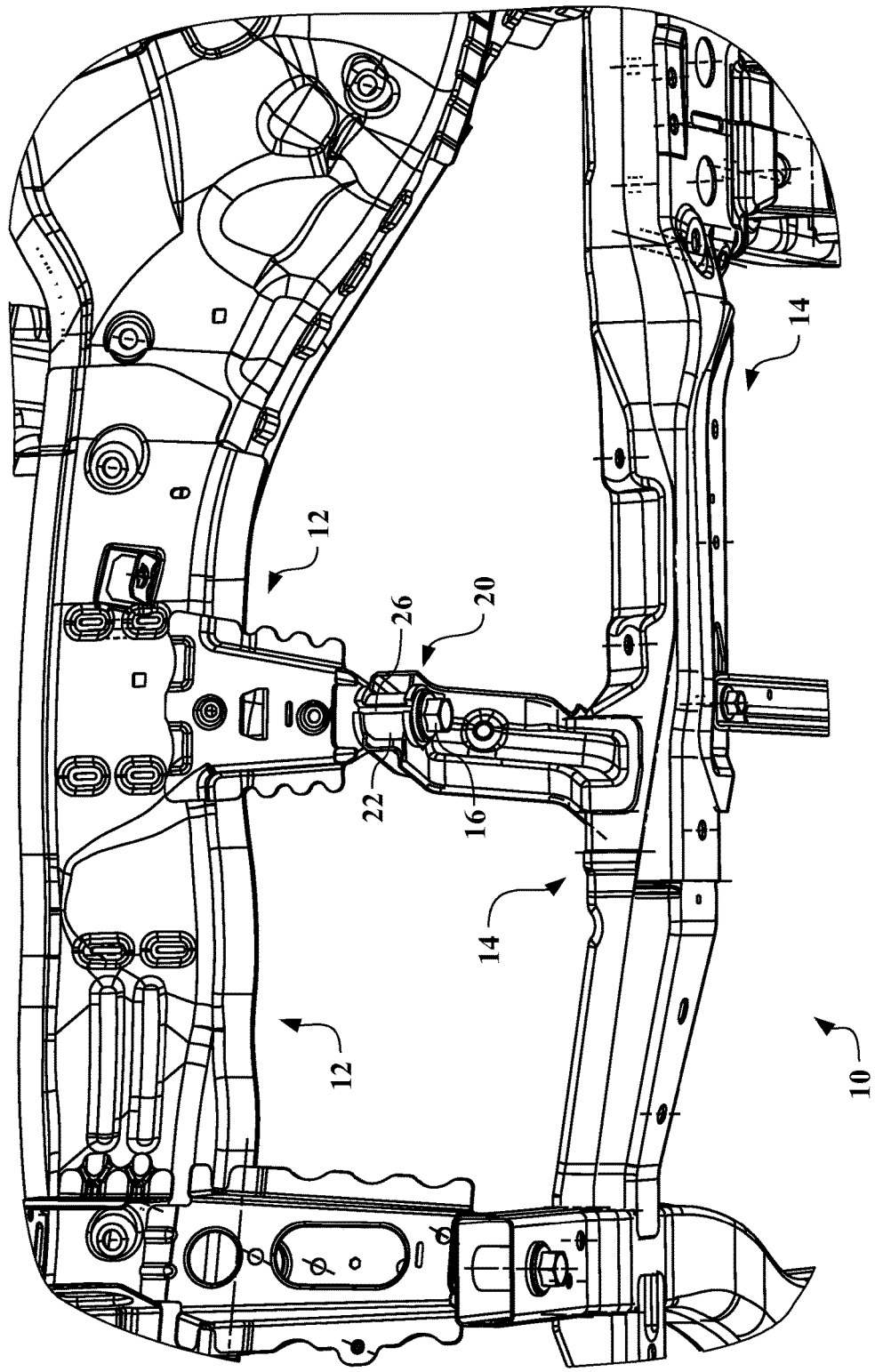
FIG. 1 is a schematic, isometric view of a portion of a vehicle body joined or attached to a vehicle chassis section via a plurality of mounting joints.

Referring to the drawings, like reference numbers correspond to like or similar components wherever possible throughout the several figures. FIG. 1 shows a schematic isometric view of a portion of a vehicle 10. A vehicle body 12, which may also be referred to as a body portion or section, is shown attached to a vehicle chassis 14, which may also be referred to as a chassis portion or chassis section, via one or more bolts 16.

Generally, the vehicle chassis 14 links the vehicle body 12 to other systems, such as suspension components or driveline components. The vehicle body 12 and the vehicle chassis 14 are both substantially-rigid structural members.

While the systems may be described with respect to automotive or vehicular applications, those skilled in the art will recognize broader applicability. Those having ordinary skill in the art will recognize that terms such as "above," "below," "upward," "downward," et cetera, are used descriptively of the figures, and do not represent limitations. Any numerical designations, such as "first" or "second" are illustrative only and are not intended to be limiting.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description.

Figure 2B:
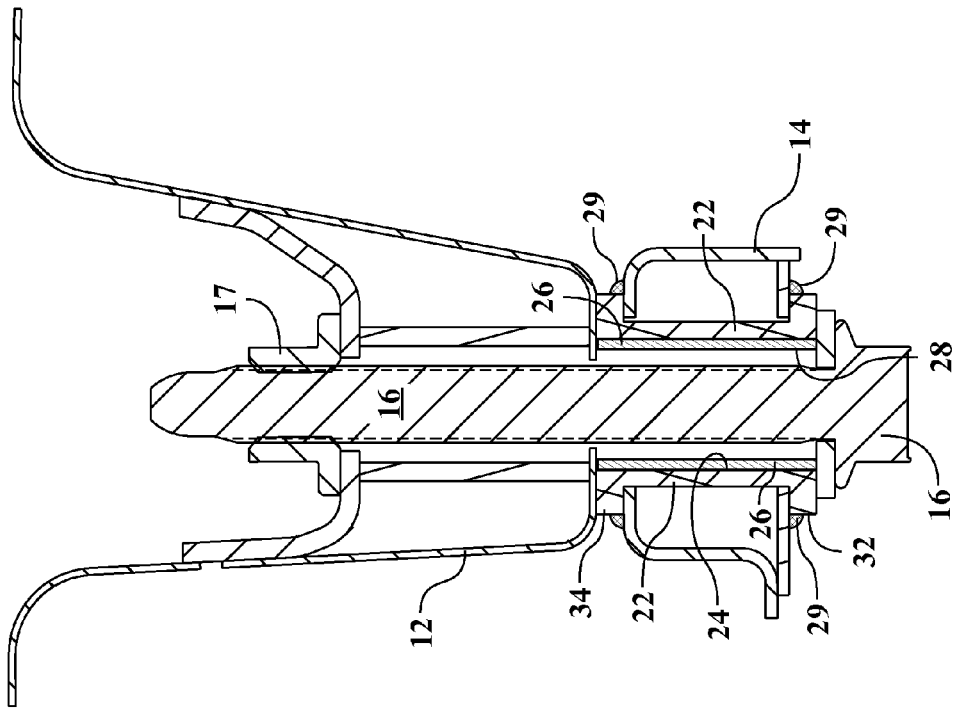
FIG. 2B is a schematic, cross-sectional view of the mounting joint shown in FIG. 2A, taken mid-plane from the mounting joint of FIG. 2A.
Figure 2A:
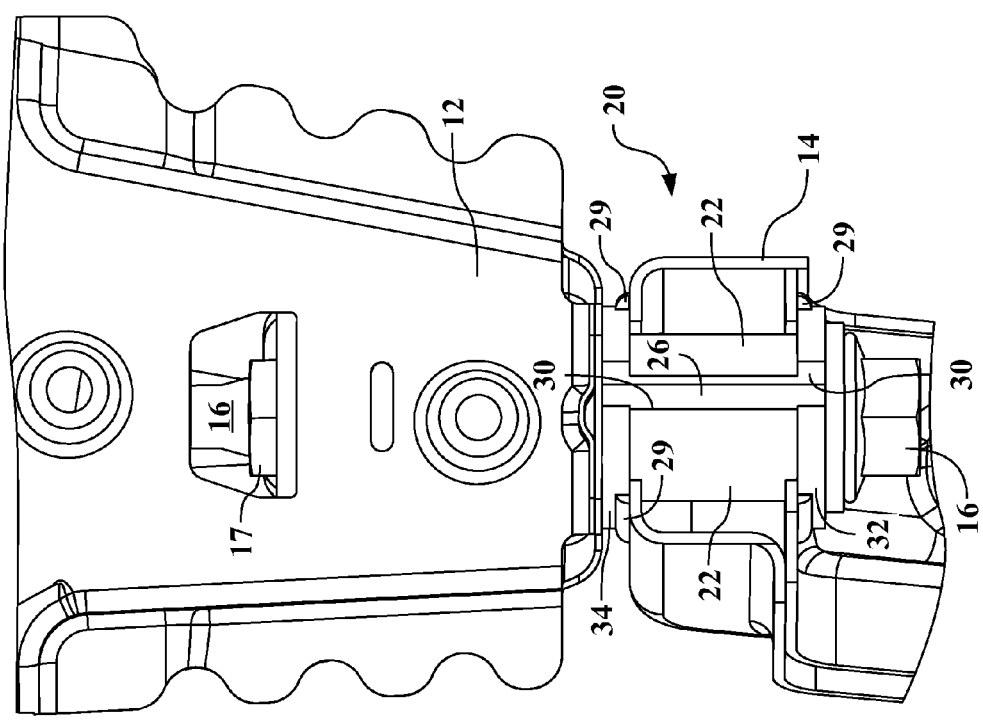
FIG. 2A is a schematic, detail plan view of one mounting joint from FIG. 1.

Referring also to FIG. 2A and to FIG. 2B, there are shown detail views of one of the attachments between the vehicle body 12 and the vehicle chassis 14, via a mounting joint or mounting assembly 20. FIG. 2A shows a schematic plan view of the mounting assembly 20 and adjacent components. FIG. 2B shows a schematic cross-sectional view of the mounting assembly 20 from substantially the same viewpoint as FIG. 2A, with the section plane being substantially mid-plane through the mounting assembly 20.

As shown in FIGS. 2A and 2B, the mounting assembly 20 joins a portion of the vehicle body 12 to a portion of the vehicle chassis 14 with the bolt 16. The portion of the vehicle chassis 14 shown may be referred to as a cradle or cradle mount. During assembly, the bolt 16 rotates about an axis (not shown) and may be attached to a nut 17 or other threaded structure. Note that the orientation of the bolt 16 shown in the figures is illustrative only and, for example, the relative location of the bolt 16 and nut 17 may be reversed.

The mounting assembly 20 includes an outer tube 22 defining a sleeve channel 24 and an inner sleeve 26 defining a bolt hole 28. The inner sleeve 26 is configured to receive the bolt 16 within the bolt hole 28 and is substantially coaxial with the bolt 16 and rotation of the bolt 16 during assembly. As shown in FIG. 2B, the diameter of the bolt hole 28 may be larger than the diameter of the bolt 16, such that there is a gap there between and different sizes of the bolt 16 may be used without altering the bolt hole 28. However, the inner sleeve 26 may also be sized such that the diameter of the bolt hole 28 provides just enough space for a clearance fit or slip fit with the bolt 16.

As used herein, the term substantially refers to quantities, values, dimensions, or alignments that are within manufacturing variance or tolerance ranges of being exact. Substantially equal dimensions, for example, may be planned as ideally equal but normal manufacturing tolerances may cause the resulting dimensions to vary by 10-20% for different pieces. Substantially aligned, for example, refers components that are intended to be truly aligned but may be slightly offset when assembled under real world manufacturing conditions.

As best viewed in FIGS. 2A and 2B, the inner sleeve 26 is disposed within the sleeve channel 24 of the outer tube 22. Both the inner sleeve 26 and the outer tube 22 are substantially cylindrical shells and are substantially coaxial with the bolt 16.

The outer tube 22 may be fixed, or fixedly attached, relative to either the vehicle chassis 14 or to the vehicle body 12. In the configuration of the mounting assembly 20 shown in FIGS. 2A and 2B, the outer tube 22 is welded directly to the vehicle chassis 14 with one or more weld beads 29. However, the outer tube 22 may be attached directly to the vehicle body 12. Furthermore, in some configurations the outer tube 22 may be attached or mated with, for example and without limitation, fasteners or adhesives.

The inner sleeve 26 may have an interference fit, or press fit, within the sleeve channel 24 of the outer tube 22. The interference fit establishes a substantially rigid connection, under most loading conditions, between the inner sleeve 24, the outer tube 22, and the vehicle chassis 14. The inner sleeve 26 may be joined to the outer tube 22 before, after, or coincidentally with attachment of the outer tube 22 to the vehicle chassis 14 (or to the vehicle body 12).

Because the mounting assembly 20 joins the vehicle body 12 to the vehicle chassis 14, the mounting assembly 20 carries or transfers differential loads between the vehicle body 12 and the vehicle chassis 14. When both the vehicle body 12 and the vehicle chassis 14 are experiencing the same loading conditions, there is substantially no differential load transferred through mounting assembly 20. Alternatively, the differential load may be viewed as carried between the bolt 16 and the outer tube 22. The differential load between the bolt 16 and the outer tube 22 may be force, torque, or combinations thereof.

The mounting assembly 20 includes an initiation slot 30 defined in the outer tube 22. Without the initiation slot 30, the sleeve channel 24 would form a substantially complete cylindrical shell and the outer tube 22 would substantially encase the inner sleeve 26. In the configuration shown, the initiation slot 30 is substantially aligned or coaxial with the inner sleeve 26, and spans the entire axial length of the outer tube 22. Therefore, the initiation slot 30 makes the sleeve channel 24 an incomplete cylindrical shell and the outer tube 22 an incomplete cylinder.

The initiation slot 30 provides a controlled point of separation when the differential load between the outer tube 22 and the bolt 16 exceeds a threshold load condition. If the threshold load condition is exceeded, the initiation slot 30 provides controlled deformation and will partially or fully open such that the inner sleeve 26 is allowed to separate from the outer tube 22.

Alternatively, both the differential load and the threshold load condition may be defined between the vehicle body 12 and the vehicle chassis 14. As the initiation slot 30 opens and the inner sleeve 26 separates from the outer tube 22, the connection between the vehicle body 12 and the vehicle chassis 14 provided by the mounting assembly 20 is also separated.

Separation of the bolt 16 from the outer tube 22 may occur through different displacement modes. For example, and without limitation, separation may occur via axial displacement (pull-out of the bolt 16 and the inner sleeve 26 upward, as viewed in FIGS. 2A and 2B), radial displacement (slide-out of the inner sleeve 26 through the opened initiation slot 30), twisting of the bolt 16 relative to the outer tube 22, or combinations thereof.

The orientation or position of the initiation slot 30 may be tuned to respond differently to specific differential load directions. For example, and without limitation, the initiation slot 30 may be aligned to relatively ease separation in response to differential loads that are transverse to the vehicle 10 and relatively hinder separation in response to differential loads that are longitudinal to the vehicle 10. Additionally, the width and length of the initiation slot 30 may be tuned to ease of separation at different threshold loads.

The initiation slot 30 is shown substantially aligned with the bolt 16 and the inner sleeve 26, such that the initiation slot 30 is vertical in FIG. 2A. However, in some configurations, the initiation slot 30 may be at an angle relative to the axis of the bolt 16 and the inner sleeve 26. Furthermore, while the initiation slot 30 is shown spanning the entire axial length of the outer tube 22, some configurations may have the initiation slot 30 defined only part way through the outer tube 22.

The mounting assembly 20 may also include a first annular tab 32 formed on one of the inner sleeve 26 and the outer tube 22, and a second annular tab 34 formed on one of the inner sleeve 26 and the outer tube 22 opposite the first annular tab 32. In the configuration shown, the first annular tab 32 and second annular tab 34 are formed on the axial ends of the outer tube 22. The first annular tab 32 and second annular tab 34 may provide additional structure for attachment of the outer tube 22 to the vehicle chassis 14 and may improve axial load transfer there between.

Figure 3:
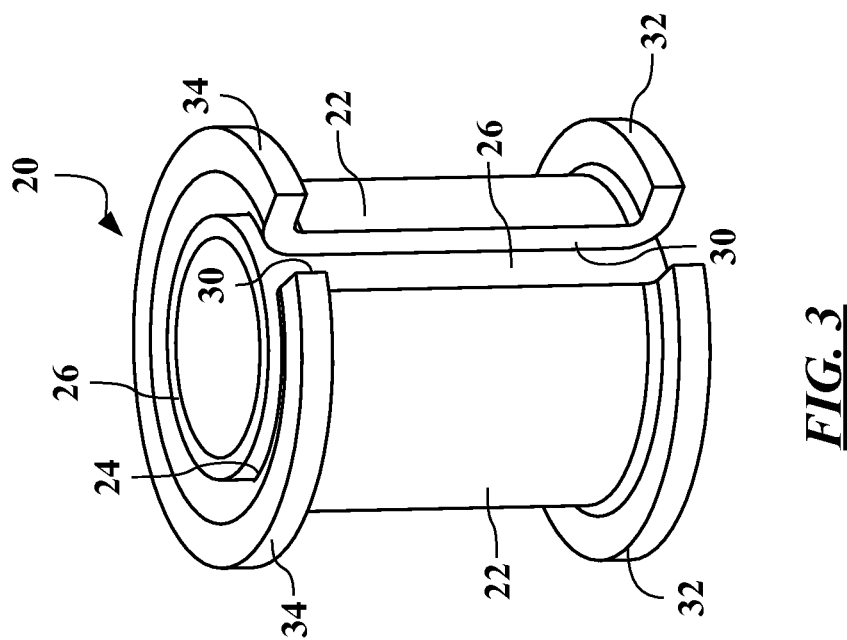
FIG. 3 is a schematic, isometric view of the mounting joint shown in FIGS. 2A and 2B, but manufactured with a different method.

Referring also to FIG. 3, and with continued reference to FIGS. 1-2B, there is shown another view of the mounting assembly 20, or a slight variant thereof. FIG. 3 shows an isometric view of the mounting assembly 20 isolated from the vehicle 10.

The mounting assembly 20 shown in FIG. 3 includes filleted or chamfered transitions between the first annular tab 32 and the second annular tab 34 and the remainder of the outer tube 22. The outer tube 22 may be manufactured as a machined or cast cylindrical shell, as shown in FIGS. 2A and 2B, or may be manufactured as a rolled cylindrical shell, as shown in FIG. 3. The resulting, filleted, cylindrical shell shown in FIG. 3 may benefit assembly or manufacturing of the mounting assembly 20 by easing insertion of the inner sleeve 26 into the outer tube 22 with the interference fit.

Figure 4:
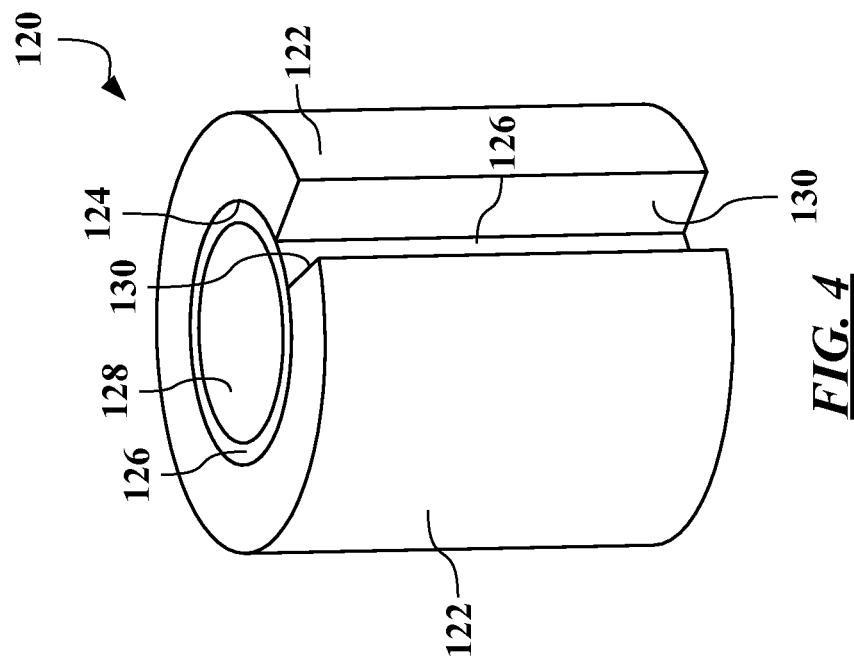
FIG. 4 is a schematic, isometric view of a mounting joint for attaching body and chassis sections.

Referring now to FIG. 4, and with continued reference to FIGS. 1-3, there is shown an isometric view of a mounting assembly 120, which may also be used to join chassis structures to body structures. The mounting assembly 120 includes an outer tube 122 defining a sleeve channel 124 and an inner sleeve 126 defining a bolt hole 128.

The inner sleeve 126 is configured to receive a bolt (not shown or not numbered) within the bolt hole 128 and is substantially coaxial with the outer tube 122 and the bolt. The outer tube 122 of the mounting assembly 120 may be fixedly attached to either the chassis or body structures with, for example and without limitation: welding, adhesives, fasteners, or an interference fit.

The mounting assembly 120 also includes an initiation slot 130 defined in the outer tube 122. The initiation slot 130 shown is substantially aligned or coaxial with the inner sleeve 126, and spans the entire axial length of the outer tube 122, such that the outer tube 122 is not a complete cylindrical shell or is an incomplete cylindrical shell. However, the initiation slot 130 may alternatively be oriented at an angle to the inner sleeve 126 or may not span the entire axial length of the outer tube 122.

The initiation slot 130 provides a controlled point of separation between the inner sleeve 126 and the outer tube 122 when the differential load between the outer tube 122 and the bolt exceeds a threshold load condition. Unlike the mounting assembly 20 shown in FIGS. 1-3, the mounting assembly 120 does not include any annular tabs at the axial ends of either the outer tube 122 or the inner sleeve 126.

Figure 5:
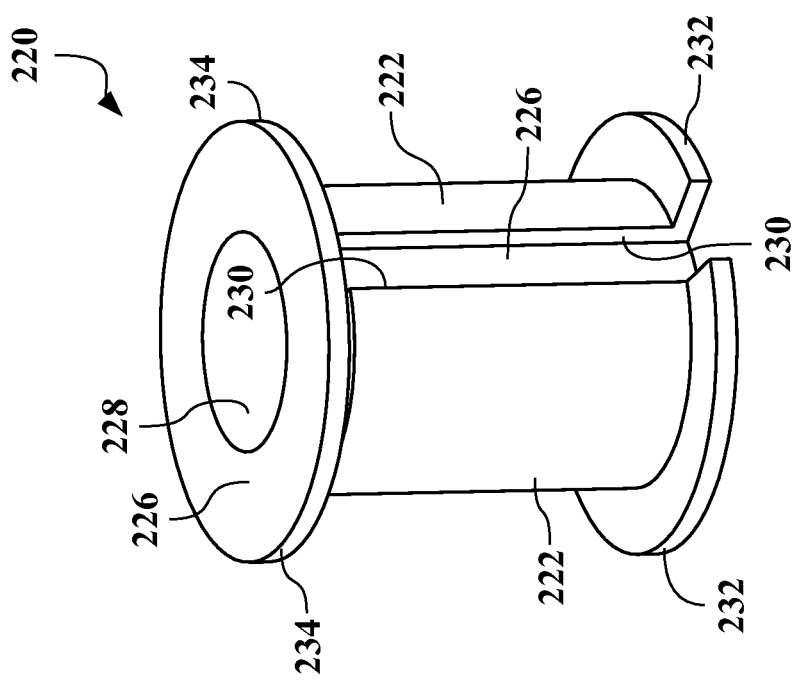
FIG. 5 is a schematic, isometric view of a mounting joint for attaching body and chassis sections.

Referring now to FIG. 5, and with continued reference to FIGS. 1-4, there is shown an isometric view of a mounting assembly 220, which may also be used to join chassis structures to body structures. The mounting assembly 220 includes an outer tube 222 defining a sleeve channel (not numbered) and an inner sleeve 226 defining a bolt hole 228.

The inner sleeve 226 is configured to receive a bolt (not shown or not numbered) within the bolt hole 228 and is substantially coaxial with the outer tube 222 and the bolt. The outer tube 222 of the mounting assembly 220 may be fixedly attached to either the chassis or body structures with, for example and without limitation: welding, adhesives, fasteners, or an interference fit. In the configuration shown, the outer tube 222 and the inner sleeve 226 are formed by stamping, casting, or billet machining. However, like the configurations shown in the other figures, either or both components may be roll-formed or be formed by other suitable techniques.

The mounting assembly 220 also includes an initiation slot 230 defined in the outer tube 222. The initiation slot 230 is substantially aligned or coaxial with the inner sleeve 226, and spans the entire axial length of the outer tube 222, such that the outer tube 222 is not a complete cylindrical shell. However, the initiation slot 230 may alternatively be oriented at an angle to the inner sleeve 226 or may not span the entire axial length of the outer tube 222. The initiation slot 230 provides a controlled point of separation between the inner sleeve 226 and the outer tube 222 when the differential load between the outer tube 222 and the bolt exceeds a threshold load condition.

The mounting assembly 220 includes a first annular tab 232 and a second annular tab 234. However, unlike the mounting assembly 20 shown in FIGS. 1-3, in the mounting assembly 220, the second annular tab 234 is formed on the inner sleeve 226 opposite the first annular tab 232, which is formed on the outer tube 222.

Figure 6:
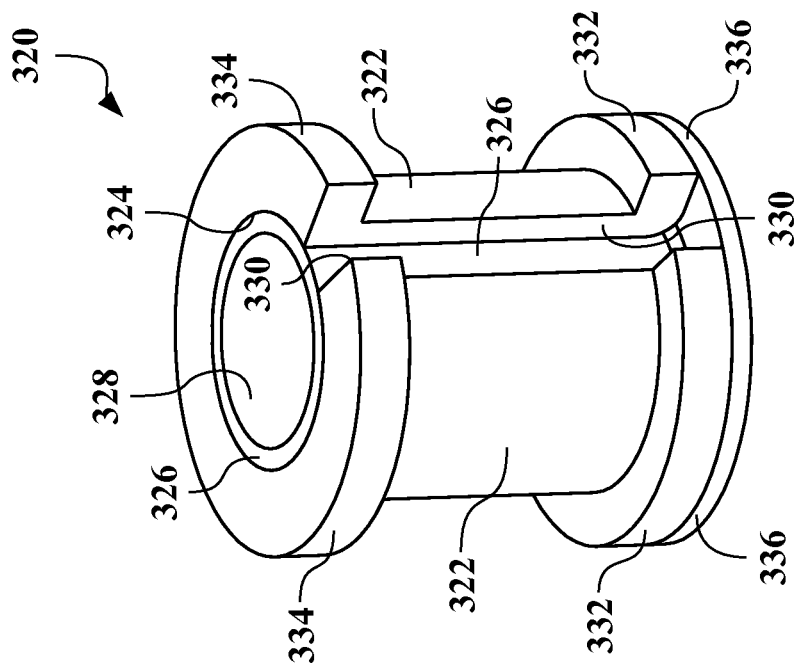
FIG. 6 is a schematic, isometric view of a mounting joint for attaching body and chassis sections.

Referring now to FIG. 6, and with continued reference to FIGS. 1-5, there is shown an isometric view of a mounting assembly 320, which may also be used to join chassis structures to body structures. The mounting assembly 320 includes an outer tube 322 defining a sleeve channel 324 and an inner sleeve 326 defining a bolt hole 328.

The inner sleeve 326 is configured to receive a bolt (not shown or not numbered) within the bolt hole 328 and is substantially coaxial with the outer tube 322 and the bolt. The outer tube 322 of the mounting assembly 320 may be fixedly attached to either the chassis or body structures with, for example and without limitation: welding, adhesives, fasteners, or an interference fit.

The mounting assembly 320 also includes an initiation slot 330 defined in the outer tube 322. The initiation slot 330 is substantially aligned or coaxial with the inner sleeve 326, and spans the entire axial length of the outer tube 322, such that the outer tube 332 is an incomplete cylindrical shell. However, the initiation slot 330 may alternatively be oriented at an angle to the inner sleeve 326 or may not span the entire axial length of the outer tube 322. The initiation slot 330 provides a controlled point of separation between the inner sleeve 326 and the outer tube 322 when the differential load between the outer tube 322 and the bolt exceeds a threshold load condition.

The mounting assembly 320 includes a first annular tab 332 and a second annular tab 334. Like the mounting assembly 20 shown in FIGS. 1-3, the first annular tab 332 and the second annular tab 334 are formed on opposite axial ends of the outer tube 322. However, the mounting assembly 320 also includes a third annular tab 336 formed on the inner sleeve 326.

In the configuration shown, the third annular tab 336 is disposed toward the lower side (as viewed in FIG. 6) of the outer tube 322, which may be adjacent the head of the bolt. However, the third annular tab 336 may be disposed on the opposite side from that shown in FIG. 6.

Figure 7:
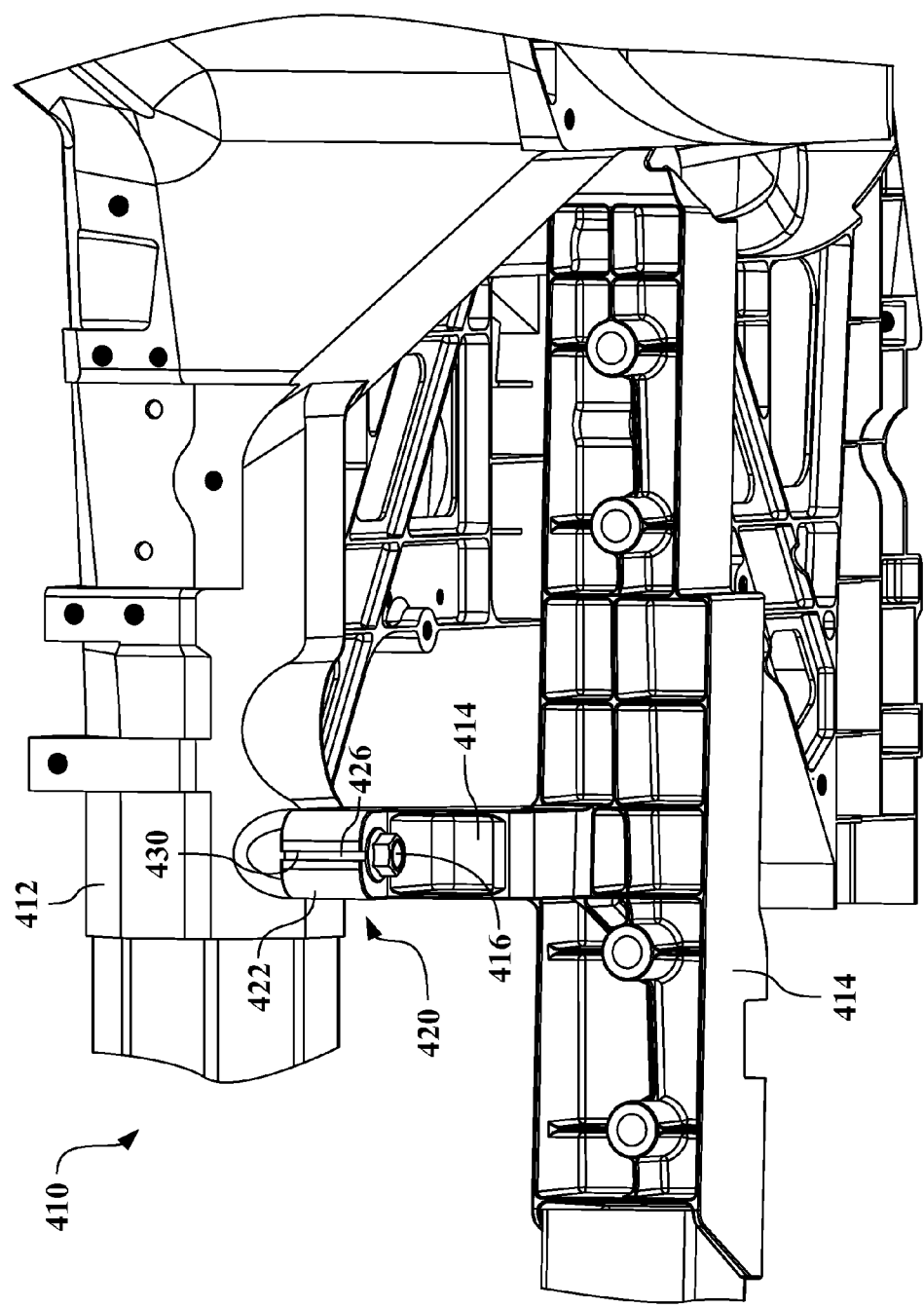
FIG. 7 is a schematic, isometric view of a portion of a vehicle body joined or attached to a vehicle chassis section via a mounting joint.

Referring now to FIG. 7, and with continued reference to FIGS. 1-6, there is shown an isometric view of a portion of a vehicle 410. A portion of a body 412 is shown attached to a chassis portion 414 via at least on bolt 416 and at least one mounting assembly 420.

The mounting assembly 420 includes an outer tube 422 and an inner sleeve 426. In the mounting assembly 420, the outer tube 422 is formed integrally as one-piece with the chassis portion 414. Therefore, there is no separate part or component for the outer tube 422, and forming the chassis portion 414 includes forming the outer tube 422.

The inner sleeve 426 is configured to receive the bolt 416 within a bolt hole (not viewable) and is substantially coaxial with the outer tube 422 and the bolt 416. The outer tube 422 of the mounting assembly 420 does not need to be fixedly attached to either the chassis or body structures because it is already formed as a part of the chassis portion 414.

The mounting assembly 420 includes an initiation slot 430 defined in the outer tube 422. The initiation slot 430 is substantially aligned or coaxial with the inner sleeve 426, and spans the entire axial length of the outer tube 422, such that the outer tube 422 does not form a complete cylinder or cylindrical shell. The initiation slot 430 provides a controlled point of separation between the inner sleeve 426 and the outer tube 422 when the differential load between chassis portion 414 and the bolt 416 exceeds a threshold load condition.

If the threshold load condition is exceeded, the initiation slot 430 will partially or fully open such that the inner sleeve 426 is allowed to separate from the outer tube 422. Therefore, as the initiation slot 430 opens and the inner sleeve 426 separates from the outer tube 422, the connection between the body 412 and the chassis portion 414 provided by the mounting assembly 420 is also separated.

Although not shown, in an alternative configuration the outer tube 422 may be formed integrally as one-piece with the body 412. Therefore, there would be no separate part or component for the outer tube 422, such that forming the body 412 would include forming the outer tube 422 in that configuration.

In the configuration shown, the mounting assembly 420 does not include any annular tabs formed on the inner sleeve 426. However, one or more annular tabs may be formed on the inner sleeve 426 toward the lower side or upper side (as viewed in FIG. 7) of the outer tube 422.

Figure 8:
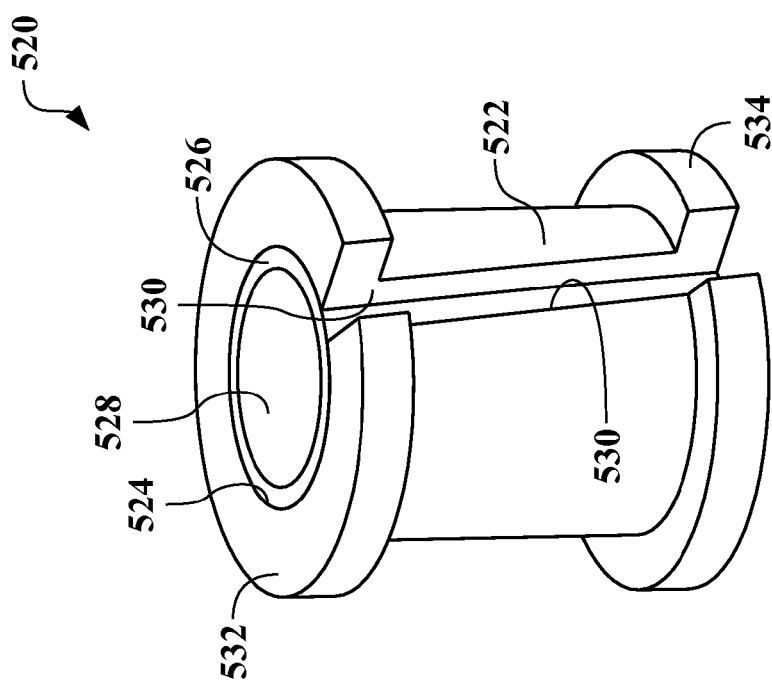
FIG. 8 is a schematic, isometric view of a mounting joint having an angled initiation slot.

Referring now to FIG. 8, and with continued reference to FIGS. 1-7, there is shown an isometric view of a mounting assembly 520, which may also be used to join chassis structures to body structures. The mounting assembly 520 includes an outer tube 522 defining a sleeve channel 524 and an inner sleeve 526 defining a bolt hole 528.

The inner sleeve 526 is configured to receive a bolt (not shown or not numbered) within the bolt hole 528 and is substantially coaxial with the outer tube 522 and the bolt. The outer tube 522 of the mounting assembly 520 may be fixedly attached to either the chassis or body structures with, for example and without limitation: welding, adhesives, fasteners, or an interference fit.

The mounting assembly 520 includes an initiation slot 530 defined in the outer tube 522. The initiation slot 530 is not substantially aligned or coaxial with the inner sleeve 526, but instead is disposed or oriented at an angle relative to the axis of the inner sleeve 526 and the bolt. The initiation slot 530 spans the entire axial length of the outer tube 522, such that the outer tube 522 is not a complete cylinder.

The initiation slot 530 provides a controlled point of separation between the inner sleeve 526 and the outer tube 522 when the differential load between the outer tube 522 and the bolt exceeds a threshold load condition. The angular initiation slot 530 provides different separation characteristics than an axial-aligned slot.

The mounting assembly 520 includes a first annular tab 532 and a second annular tab 534. The first annular tab 532 and the second annular tab 534 are formed on opposite axial ends of the outer tube 522.

Figure 9:
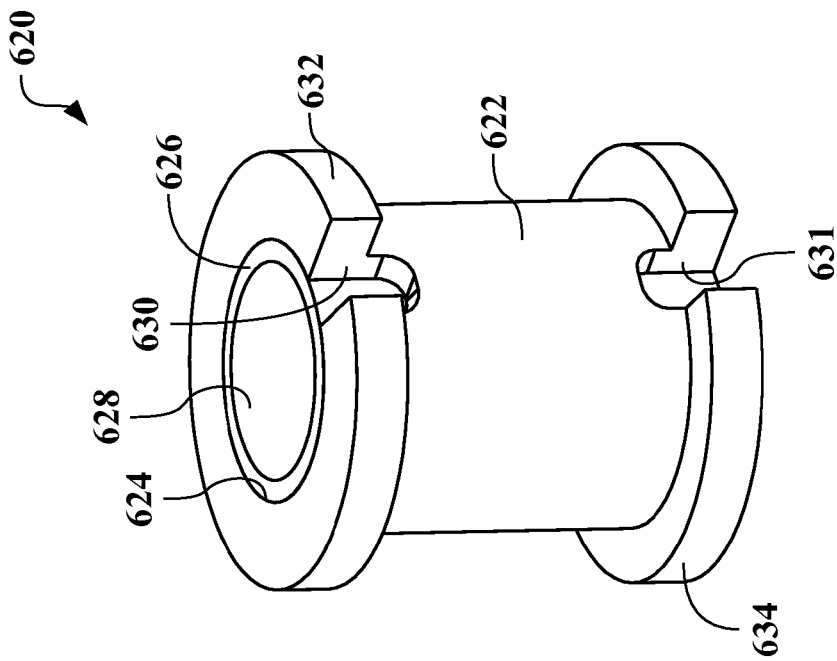
FIG. 9 is a schematic, isometric view of a mounting joint having a split, or dual, initiation slot.

Referring now to FIG. 9, and with continued reference to FIGS. 1-8, there is shown an isometric view of a mounting assembly 620, which may also be used to join chassis structures to body structures. The mounting assembly 620 includes an outer tube 622 defining a sleeve channel 624 and an inner sleeve 626 defining a bolt hole 628.

The inner sleeve 626 is configured to receive a bolt (not shown or not numbered) within the bolt hole 628 and is substantially coaxial with the outer tube 622 and the bolt. The outer tube 622 of the mounting assembly 620 may be fixedly attached to either the chassis or body structures with, for example and without limitation: welding, adhesives, fasteners, or an interference fit.

The mounting assembly 620 includes a first initiation slot 630 defined in the outer tube 622. The first initiation slot 630 is substantially aligned or coaxial with the inner sleeve 626, but does not extend through the entire axial length of the outer tube 622. The mounting assembly 620 also includes a second initiation slot 631 defined in the outer tube 622.

In the configuration shown in FIG. 9, the second initiation slot 631 substantially mirrors the first initiation slot 630 in shape, width, and axial length. However, the first initiation slot 630 and the second initiation slot 631 may have different shapes, width, or axial lengths. Furthermore, one or both of the first initiation slot 630 and the second initiation slot 631 may be angled relative to the axis of the inner sleeve 626 and the bolt.

The outer tube 622 has portions that form a complete cylindrical shell and portions where the cylindrical shell is interrupted by the first initiation slot 630 and the second initiation slot 631. The first initiation slot 630 and the second initiation slot 631 cooperatively provide controlled separation between the inner sleeve 626 and the outer tube 622 when the differential loading conditions between the outer tube 622 and the bolt exceeds a threshold load.

The mounting assembly 620 also includes a first annular tab 632 and a second annular tab 634 formed in the outer tube 622. The first annular tab 632 and the second annular tab 634 are formed on opposite axial ends of the outer tube 622.

The detailed description and the drawings or figures are supportive and descriptive of the subject matter discussed herein. While some of the best modes and other embodiments for have been described in detail, various alternative designs, configurations, and embodiments exist.

The invention claimed is:

1. A mounting assembly for joining a vehicle body to a vehicle chassis with a bolt, the mounting assembly comprising:
   an outer tube defining a sleeve channel, wherein the outer tube is configured to be fixed to one of the vehicle chassis and the vehicle body;
   an inner sleeve disposed within the sleeve channel of the outer tube, wherein the inner sleeve defines a bolt hole configured to receive the bolt, such that the outer tube, the inner sleeve, and the bolt cooperate to join the vehicle body to the vehicle chassis; and
   an initiation slot defined in the outer tube, such that the sleeve channel is an incomplete cylindrical shell.

2. The mounting assembly of claim 1,
   wherein the inner sleeve has an interference fit within the sleeve channel of the outer tube.

3. The mounting assembly of claim 2,
   wherein the initiation slot is substantially coaxial with the inner sleeve.

4. The mounting assembly of claim 3,
   wherein the outer tube is welded to the one of the vehicle chassis and the vehicle body.

5. The mounting assembly of claim 4, further comprising:
   a first annular tab formed on one of the inner sleeve and the outer tube.

6. The mounting assembly of claim 5, further comprising:
   a second annular tab formed on one of the inner sleeve and the outer tube opposite the first annular tab.

7. The mounting assembly of claim 2,
   wherein the initiation slot is configured to open and allow separation of the inner sleeve from the outer tube in response to a threshold differential load applied between the vehicle body and the vehicle chassis.

8. The mounting assembly of claim 2,
   wherein the outer tube is formed integrally as one-piece with the vehicle chassis.

9. The mounting assembly of claim 1,
   a first annular tab formed on the outer tube; and
   a second annular tab formed on the outer tube opposite the first annular tab,
   wherein the initiation slot is substantially coaxial with the inner sleeve.

10. A vehicle, comprising:
    a vehicle body;
    a vehicle chassis;
    a bolt;
    a mounting assembly, having:
       an outer tube defining a sleeve channel, wherein the outer tube is fixed to one of the vehicle chassis and the vehicle body;
       an inner sleeve disposed within the sleeve channel of the outer tube, wherein the inner sleeve define a bolt hole configured to receive the bolt, such that the outer tube, the inner sleeve, and the bolt cooperate to join the vehicle body to the vehicle chassis; and
       an initiation slot defined in the outer tube, such that the sleeve channel is an incomplete cylindrical shell, wherein the initiation slot is configured to open and allow separation of the inner sleeve from the outer tube in response to a threshold differential load applied between the vehicle body and the vehicle chassis.

11. A mounting joint configured to join a bolt to a chassis portion, comprising:

an outer tube defining a sleeve channel;

an inner sleeve defining a bolt hole configured to receive the bolt, wherein the inner sleeve is disposed within the sleeve channel of the outer tube; and an initiation slot defined in the outer tube, wherein the initiation slot is configured to open and allow separation of the inner sleeve from the outer tube in response to a threshold differential load applied between the bolt and the chassis portion.

12. The mounting joint of claim 11,
wherein the initiation slot is substantially coaxial with the inner sleeve.

13. The mounting joint of claim 12, further comprising:
a first annular tab formed on one of the inner sleeve and the outer tube.

14. The mounting joint of claim 13,
wherein the inner sleeve has an interference fit within the sleeve channel of the outer tube.

15. The mounting joint of claim 11, wherein the initiation slot is a first initiation slot formed in one end of the outer tube, and further comprising:
a second initiation slot formed in the opposite end of the outer tube from the first initiation slot.

16. The mounting joint of claim 11,
wherein the initiation slot is oriented at an angle to an axis of the inner sleeve.

17. The mounting joint of claim 11, further comprising:
a first annular tab formed on the inner sleeve, wherein the first annular tab extends outward toward the outer tube.

18. The mounting joint of claim 11, further comprising:
a first annular tab formed on the outer tube, wherein the first annular tab extends away from the inner sleeve.

* * * * *